(12) United States Patent
Middleton et al.

(10) Patent No.: US 6,183,356 B1
(45) Date of Patent: Feb. 6, 2001

(54) HUMANE FISH KILLING METHOD AND APPARATUS

(75) Inventors: Ashley Paul Middleton, Glastonbury; Steven Charles Kestin, Bristol, both of (GB)

(73) Assignee: Middleton Engineering Limited (GB)

( * ) Notice: Under 35 U.S.C. 154(b), the term of this patent shall be extended for 0 days.

(21) Appl. No.: 09/458,242

(22) Filed: Dec. 9, 1999

(51) Int. Cl.⁷ .................................................. A22C 25/08
(52) U.S. Cl. .............................. 452/57; 452/62; 452/65; 452/54; 452/196
(58) Field of Search ............................. 452/52, 53, 54, 452/57, 61, 62, 63, 65, 196

(56) References Cited

U.S. PATENT DOCUMENTS

| | | | |
|---|---|---|---|
| 2,506,227 | * 5/1950 | Liindsen | 452/52 |
| 2,722,036 | * 11/1955 | Servidio | 452/59 |
| 2,932,849 | * 4/1960 | Missman | 452/196 |
| 4,127,919 | * 12/1978 | Buddecke | 452/196 |
| 5,327,854 | * 7/1994 | Smith et al. . | |
| 5,376,043 | * 12/1994 | Carter | 452/65 |
| 5,453,042 | * 9/1995 | Novello | 452/196 |
| 5,732,501 | * 3/1998 | Ausburn | 43/5 |
| 5,733,195 | * 3/1998 | Wall | 463/47.2 |
| 6,001,011 | * 12/1999 | Johnson | 452/65 |

* cited by examiner

*Primary Examiner*—Willis Little
(74) *Attorney, Agent, or Firm*—Melvin I. Stoltz

(57) ABSTRACT

Fish, such as salmon, are caused to move along a predetermined path until the leading part of the fish hits a lever to initiate a cycle of operations comprising:
  a) holding the fish by releasable holding means,
  b) stunning the fish,
  c) killing the fish in such manner as to effect exsanguination thereof, and
  d) releasing the killed fish.

10 Claims, 4 Drawing Sheets

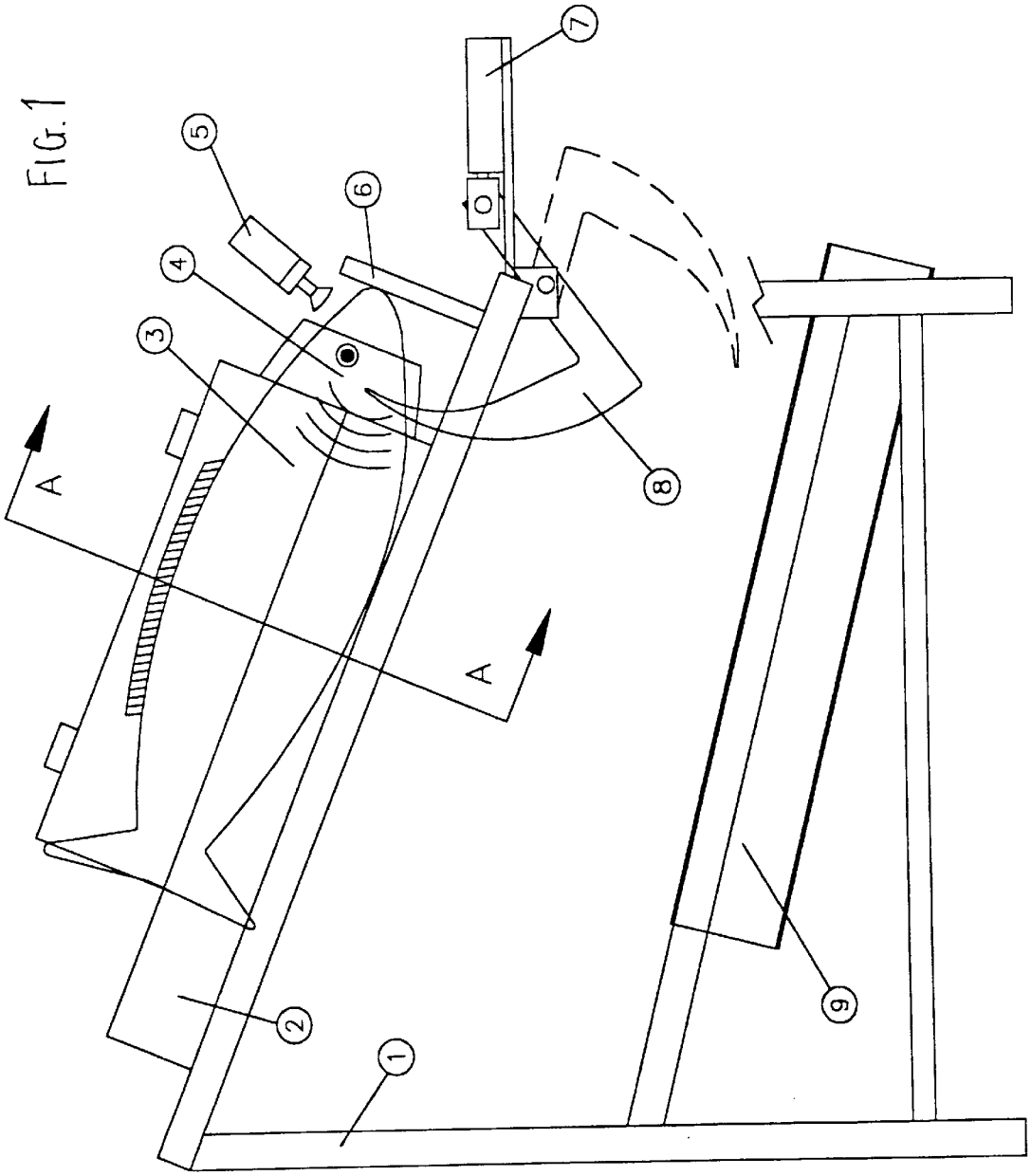

HUMANE FISH KILLING METHOD AND APPARATUS

FIELD OF THE INVENTION

This invention relates to a method and apparatus for, the humane killing of fish and, although the invention has been developed in relation to the killing of salmon, the method and apparatus are applicable to the killing of other species of fish.

The present method of killing farmed salmon involves feeding the salmon on to a table where they are first stunned using a hand-held club or placed in a bath of sea water saturated with carbon dioxide. After stunning, the fish are killed/bled using a knife to cut the gill arches on one or both sides of the fish. This causes the blood of the fish to be discharged, i.e. it is an exsanguination process. The removal of the blood results in brain death and is believed to result in an improved quality for the flesh of the fish.

The present method described above is labour-intensive and, when the operators have been at work for a length of time, there is a possibility that the salmon will only be partially stunned before being killed.

It is accordingly an object of the present invention to provide an improved method and apparatus for the humane killing of fish.

SUMMARY OF THE INVENTION

According to a first aspect of the present invention there is provided a method for the humane killing of fish, which method includes.

a) causing a fish to move along a predetermined path,
b) halting such movement of the fish at a predetermined position along the path,
c) holding the fish at said predetermined position by releasable holding means,
d) stunning the fish,
e) killing the fish in such manner as to effect exsanguination of the fish, and
f) releasing the killed fish.

Holding, stunning and killing of the fish may all be effected by pneumatically-operated means. Stunning is preferably effected by the transfer of energy from a fast-moving impact member to the skull of the fish, resulting in concussion of the fish. Alternatively, stunning of the fish may be effected electrically.

Killing of the fish is preferably effected by a knife which is moved arcuately to enter the heart of the fish. The distance and path of travel of the knife are preferably such as to cause the knife to enter first the heart and then the brain of the fish. Killing of the fish may alternatively be effected by gill slitting. In such case, gill slitting is preferably effected using an elongated rotary cutting element.

According to a second aspect of the present invention there is provided apparatus for use in the humane killing of fish, which apparatus includes:

a) means defining a predetermined path along which a fish can be caused to travel,
b) stop means for halting the movement of the fish at a predetermined position along said path,
c) releasable holding means for holding the fish at said predetermined position,
d) stunning means for stunning the held fish,
e) killing means for killing the stunned fish in such manner as to effect exsanguination of the fish, and
f) means for releasing the killed fish.

If guide means are provided for defining the predetermined path, the guide means preferably comprises a pair of guide walls which define a generally V-shaped channel along which a fish can travel. The channel is preferably inclined to the horizontal with the arrangement such that a fish is fed into the higher end of the channel and passes gravitationally to the other, lower end of the channel.

The releasable holding means is preferably pneumatically-operated and serves to restrain the fish against any rearward or lateral movement when held at said predetermined position.

The two guide walls are preferably pivotally mounted on a support frame for relative pivotal movement about an axis above and substantially parallel to the predetermined path along which the fish is caused to move. The arrangement is preferably such that, at the beginning of a cycle of operations, the guide walls are in their supporting positions, in which the lower edges thereof are only a short distance apart, i.e. short in relation to the width of a fish so that the fish cannot drop through the gap between said lower edges, whereas, after the fish has been killed, the guide walls are moved away from each other to provide a gap through which the killed fish can drop. The two guide walls may be of generally clamshell configuration.

The stop means for halting movement of the fish preferably includes a movably mounted lever which is engaged by the leading part of the fish as it moves along the predetermined path, the lever being located at the end of the V-shaped channel along which the fish can travel. The lever is preferably an actuating member which initiates a cycle of operations of a number of pneumatically-operated elements.

The holding means is preferably the first element to operate during said cycle of operations. The holding means preferably includes a pair of air bags which are carried by the guide walls and are positioned so that they engage the sides of the fish. The holding means preferably also includes a pair of inflatable cheek pads which are positioned so that they can engage and restrain the sides of the leading part of the fish.

If the stunning means is electrically operated, it will preferably include a pair of electrodes mounted on the cheek pads. The electrification period may last for about 0.5 seconds and the current which is used should not exceed 200 milliamps.

The air bags and the cheek pads are preferably positively and rapidly inflated so as to move into engagement with the fish, such rapid inflation being effected by, for example, causing a chamber containing compressed air to discharge into the air bags and cheek pads. Rapid deflation of the air bags and cheek pads is preferably effected towards the end of the cycle of operations by, for example, a bellows-type suction device which withdraws the compressed air from the air bags and cheek pads.

Stunning of the fish, when held in position by the air bags and cheek pads, is preferably effected by means of a pneumatically-operated hammer. The hammer preferably comprises a mass having a generally domed presented face and carried on a stem which is movable axially towards the location of the brain of the fish. The stem preferably carries a piston at its other end, the piston being movable within a primary chamber linked to a pressure reservoir in such manner that, at the appropriate position in the cycle of operations of the apparatus, a valve connecting the pressure reservoir to the primary chamber is opened to effect a rapid increase in pressure within the primary chamber and hence rapid acceleration of the hammer towards the brain of the fish.

The acceleration applied to the hammer and the distance of travel of the hammer before the presented face thereof strikes the head of the fish is preferably such that, by the time the hammer strikes the head of the fish, the velocity of the hammer is at least 18 meters per second.

Internal buffering means are preferably provided between the piston and the end of the primary chamber to absorb any residual energy in the hammer after it strikes the head of the fish and the control means controlling the cycle of operations of the apparatus is preferably such as to return the hammer to its original position once the required impact has been applied to effect stunning of the fish.

Alternative stunning means include, as mentioned above, electrodes mounted on the cheek pads, or a cylindrical pin which is moved pneumatically so as to penetrate the brain of the fish. The pin may be either a solid pin or in the form of a tube through which compressed air or potassium chloride is injected into the brain, i.e. it is an asperated punch.

The means for killing the fish and effecting exsanguination thereof may be in the form of a knife of generally arcuate form arranged for pivotal movement about its center of curvature and movable under the control of a pneumatic piston and cylinder mechanism so that, a matter of microseconds after the fish has been stunned, the knife is moved upwardly, through the gap between the lower edges of the guide walls so as to pierce the heart of the fish and cause the fish's blood to be discharged. The distance of travel of the knife is preferably such that, after the knife has pierced the heart of the fish, it continues to travel upwardly so as to pierce the brain and/or the anterior spinal cord of the fish. The knife is then caused to return by the piston and cylinder mechanism to its original position so that it is completely withdrawn from the fish before the air bags and cheek pads are deflated and the holding action on the killed fish is released.

As mentioned above, means may alternatively be provided for killing the fish by gill slitting using an elongated rotary cutting element.

The rotary cutting element is preferably arranged to rotate at high speed and, when so rotating, is advanced so as to enter the side of the fish in the gill area. After entering the gill area of the fish, the rotating cutter is preferably moved downwardly so as to sever the artery interconnecting the heart and gills of the fish. After having moved downwardly a sufficient distance to ensure that the artery has been severed, the rotating cutter is then preferably returned to its original position in readiness for the next fish.

The control system is preferably such that, at the same time that the air bags and cheek pads are being deflated, the guide walls are being moved away from one another to increase the spacing between the lower edges of the guide walls so that the fish can drop into, for example, a discharge chute for delivery to a packing station.

The fish may be placed manually in position at the higher end of the path defined by the guide walls or may be transported into the required position by means of a conveyor system. In either event, the fish is caused to enter the V-shaped channel head first and in its normal swimming position.

In the case of salmon farming, the apparatus will normally be positioned on a boat, barge or raft and the salmon will be withdrawn from the cages (sea areas) in which they have been raised by the currently employed techniques, for example, using an air lift pump, and may be discharged on to a grading table from which the fish are transferred to the channel, with oversize and undersize fish being rejected.

BRIEF DESCRIPTION OF THE DRAWINGS

FIG. 1 is a diagrammatic representation of the apparatus of the invention,

DESCRIPTION OF THE PREFERRED EMBODIMENTS

Figure 3:
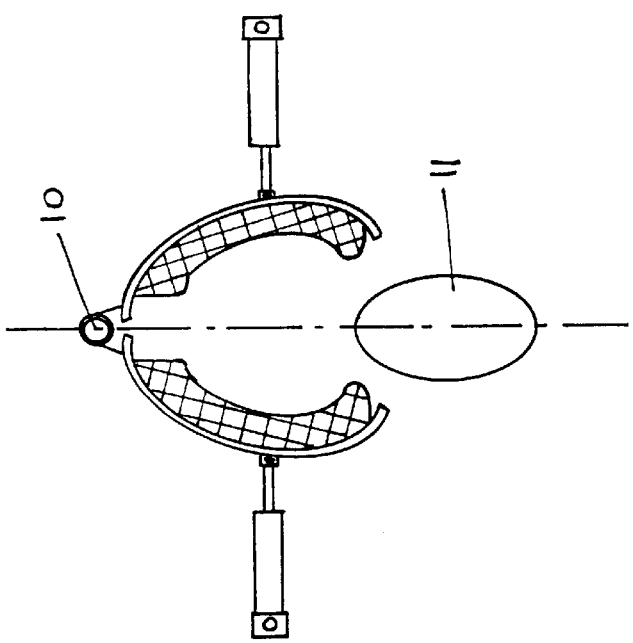
FIGS. 2 and 3 are detail views taken along the line A—A of FIG. 1 illustrating the mode of operation of the releasable holding means.

As shown in FIG. 1, the apparatus includes a frame 1 on which there is an inclined feed chute 2 to the upper end of which the salmon 11 are fed headfirst so that they will pass gravitationally down the chute 2 until the nose of the salmon 11 comes up against a movably mounted stop 6 which acts also as a trigger to initiate a cycle of operations of the apparatus. The stop 6 will normally be in the form of a pivotally mounted lever.

The first operation in the cycle of operations is the actuation of the releasable holding means. This comprises inflatable airbags and cheek pads mounted on a pair of guide walls 12 which are pivoted together for relative movement about the axis of a hinge 10 located above the path of movement of the salmon 11. The guide walls 12 are movable by means of pneumatically operated piston and cylinder mechanisms 13. The airbags are mounted on the inner surfaces of the guide walls 12 at the positions indicated at 3 in FIG. 1 whilst the inflatable cheek pads are mounted on the inner surfaces of the guide walls 12 at the positions indicated at 4 in FIG. 1.

Figure 2:
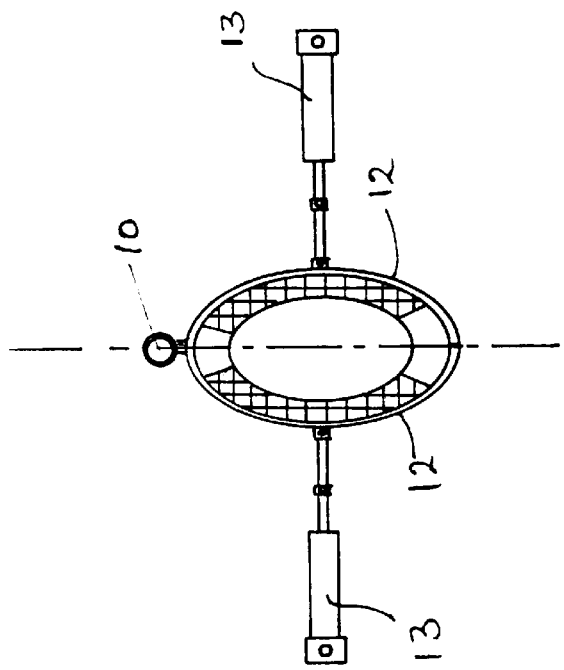

The guide walls 12 are initially in the positions shown in FIG. 2, and the airbags and the cheek pads are inflated, after the nose of the salmon 11 strikes the lever 6 as described above, to grip the salmon 11 on both sides and restrain it against any movement.

A chamber (not shown) containing compressed air is connected by a line containing a valve (also not shown) to the airbags and the cheek pads. When the lever 6 is operated by the nose of the salmon 11, the valve is opened to effect rapid inflation of the airbags and the cheek pads.

A stunning hammer 5 is then operated and moves towards the brain 16 of the salmon 11 so as to apply a sufficient impact to the salmon 11 to effect stunning of the salmon 11. The preferred form of stunning is that shown in FIGS. 1 and 6 and includes the use of the hammer 5, which has a dome-shaped head to engage the head of the salmon 11, though the alternatives shown in FIGS. 7 to 9 could also be employed.

Once the salmon 11 has been stunned, compressed air is supplied to a knife cylinder 7 to cause pivotal movement of a knife 8 having an arcuate blade so that the knife blade is moved upwardly so as to penetrate the heart 17 of the salmon and effect exsanguination of the salmon 11. The extent of upward travel of the knife blade is preferably such that it also pierces the brain 16 of the salmon 11. Alternative methods of exsanguination are shown in FIGS. 4 and 4A and 5 and 5A.

After the salmon 11 has been stunned, killed and exsanguinated, and the knife 8 has been withdrawn, the airbags and the cheek pads are positively deflated and the cylinders 13 are actuated to move the clam-shell shape guide walls 12 from the positions shown in FIG. 2 into the positions shown in FIG. 3. The salmon 11 is then free to drop on to an exit chute 9 for passage to a packing or other operating station, for example, to an evisceration apparatus. The guide walls 12 are then returned to the position shown in FIG. 2 ready to receive the next salmon.

Rapid deflation of the airbags and the cheek pads is effected by a bellows-type suction device (not shown) which withdraws the compressed air from the airbags and the cheek pads.

Figure 4A:
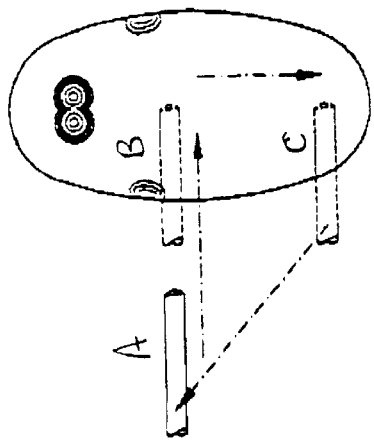
FIGS. 4 and 4A and 5 and 5A show alternative means of exsanguination.
Figure 5A:
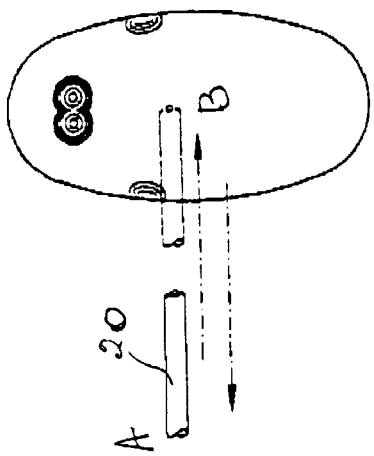
Figure 4:
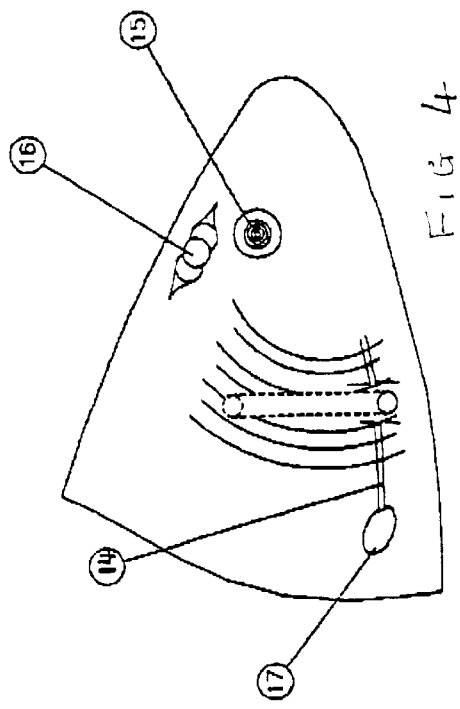
Figure 5:
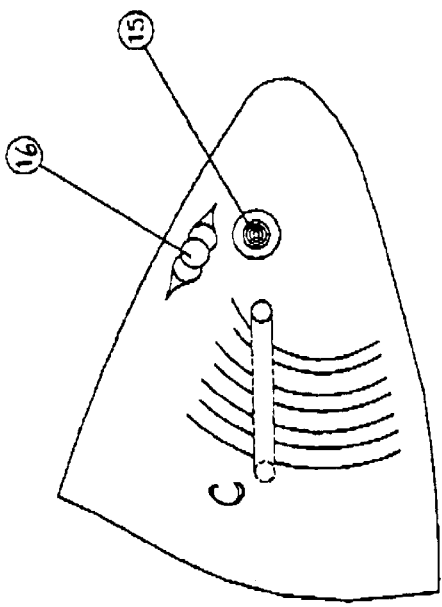

The alternative means of exsanguination shown in FIGS. 4 and 4A comprises an elongated rotary cutter 20 which is rotated at high speed and is moved forwardly, while still rotating at high speed from an initial position A in FIG. 4A to an advanced position B in which it enters the gill area of the salmon. It is then moved downwardly to position C so as to cut through the heart to gill artery 14 of the salmon 11. The high-speed rotary cutter 20 is then moved back to its original position.

The second alternative means of exsanguination shown in FIGS. 5 and 5A again comprises a high-speed rotary cutter 20 which is positioned so that it is substantially in line with an eye 15 of the salmon. It is moved forwardly from an initial position A in FIG. 5A to an advanced position B in which it enters the gill area of the salmon. It is then moved rearwardly to position C to effect a substantial incision in the gill area before being moved back to its original position.

Figure 6:
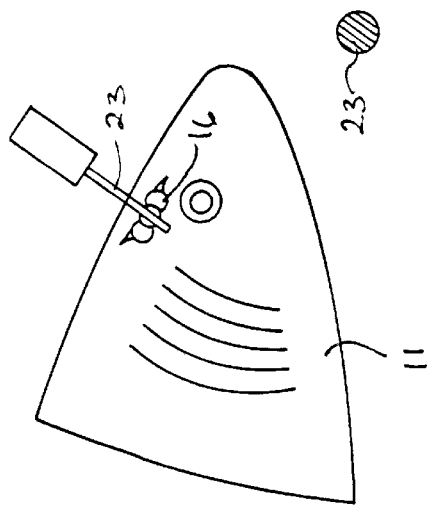
FIGS. 6 to 9 show different methods of stunning.

The stunning means shown in FIGS. 1 and 6 comprises a hammer 5 mounted on a stem connected to a piston which is movable within a chamber 22 linked to a pressure reservoir (not shown) in such manner that, at the appropriate position in the cycle of operations, a valve connecting the pressure reservoir to the chamber 22 is opened to effect a rapid increase in the pressure in the chamber 22 and hence rapid acceleration of the hammer 5 such that, by the time the hammer 5 strikes the head of the fish 11 in line with the brain 16 of the fish 11, the velocity of the hammer is at least 18 meters per second.

Internal buffering means (not shown) are provided between the piston and the end wall of the chamber 22 to absorb any residual energy in the hammer 5 after it strikes the head of the fish 11. The control means controlling the cycle of operations of the apparatus is such as to return the hammer 5 to its original position once the required impact has been applied to the fish 11 to effect stunning thereof.

Figure 7:
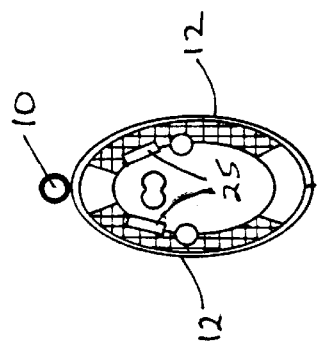
Figure 8:
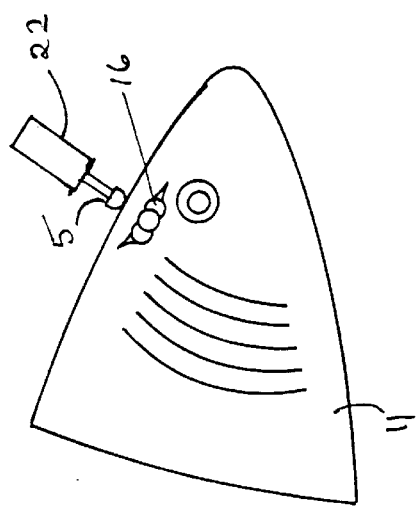
Figure 9:
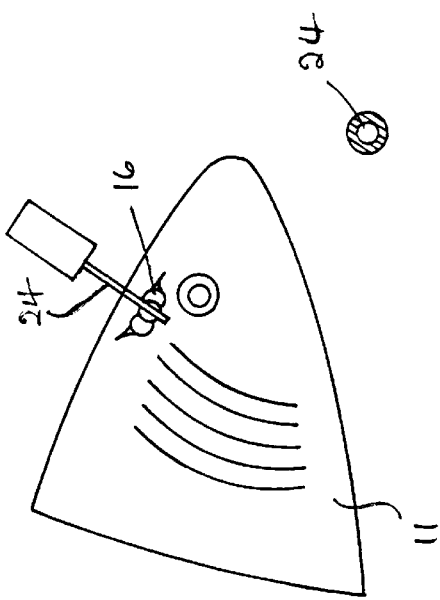

The alternative stunning means shown in FIGS. 7 to 9 are as follows:

a) a solid pin 23 which is moved pneumatically so as to penetrate the brain 16 of the fish 11 (FIG. 7), b) a tube 24 which is moved pneumatically so as to penetrate the brain 16 of the fish 11 and through which compressed air or potassium chloride is injected into the brain 16 of the fish 11 (FIG. 8), and c) electrodes 25 mounted on the cheek pads (FIG. 9).

It will be appreciated that, although the invention has been specifically developed in relation to the killing of salmon, the method and apparatus of the invention are applicable to the humane killing of other kinds of fish.

What is claimed is:

1. A method for the humane killing of fish, which method includes:

a) causing a fish to move along a predetermined path, b) halting such movement of the fish at a predetermined position along the path, c) holding the fish at said predetermined position by releasable holding means, d) stunning the fish, e) killing the fish in such manner as to effect exsanguination of the fish, and f) releasing the killed fish.

2. A method as claimed in claim 1, in which holding, stunning and killing of the fish are all effected by pneumatically-operated means.

3. A method as claimed in claim 1, in which killing of the fish is effected by a knife which is moved arcuately to enter the heart of the fish and in which the distance and path of travel of the knife are such as to cause the knife to enter first the heart and then the brain of the fish.

4. Apparatus for use in the humane killing of fish, which apparatus includes:

a) means defining a predetermined path along which a fish can be caused to travel, b) stop means for halting the movement of the fish at a predetermined position along said path, c) releasable holding means for holding the fish at said predetermined position, d) stunning means for stunning the held fish, e) killing means for killing the stunned fish in such manner as to effect exsanguination of the fish, and f) means for releasing the killed fish.

5. Apparatus as claimed in claim 4, in which guide means are provided for defining the predetermined path, the guide means comprising a pair of guide walls which define a generally V-shaped channel along which a fish can travel.

6. Apparatus as claimed in claim 5, in which the releasable holding means is pneumatically-operated and comprises inflatable elements carried by the guide walls.

7. Apparatus as claimed in claim 5, in which the two guide walls are pivotally mounted on a support frame for relative pivotal movement about an axis above and substantially parallel to the predetermined path along which the fish is caused to move.

8. Apparatus as claimed in claim 6, in which the stop means for halting movement of the fish includes a movably mounted lever which is engaged by the leading part of the fish as it moves along the predetermined path, the lever being an actuating member which initiates a cycle of operations of a number of pneumatically-operated elements.

9. Apparatus as claimed claim 5, in which the means for killing the fish and effecting exsanguination thereof is in the form of a knife of generally arcuate form arranged for pivotal movement about its centre of curvature and movable under the control of a pneumatic piston and cylinder mechanism so that, a matter of microseconds after the fish has been stunned, the knife is moved upwardly, through a gap between the lower edges of the guide walls so as to enter the heart of the fish and cause the fish's blood to be discharged.

10. Apparatus as claimed in claim 4, in which the means for killing the fish and effecting exsanguination thereof comprises an elongated rotary cutting element which is arranged to rotate at high speed and, when so rotating, is advanced so as to enter the side of the fish in the gill area.

* * * * *